United States Patent [19]

Larson

[11] 4,064,775
[45] Dec. 27, 1977

[54] METHOD AND APPARATUS FOR REPAIRING CONVEYOR BELTS

[75] Inventor: Robert L. Larson, Des Plaines, Ill.

[73] Assignee: Regis Belt Maintenance Corporation, Chicago, Ill.

[21] Appl. No.: 650,497

[22] Filed: Jan. 19, 1976

[51] Int. Cl.² .............................................. B26D 3/28
[52] U.S. Cl. ................................................ 83/4; 83/1
[58] Field of Search ......................................... 83/4, 1

[56] References Cited

U.S. PATENT DOCUMENTS

| | | | |
|---|---|---|---|
| 1,684,763 | 9/1928 | Fritts | 83/4 |
| 2,484,619 | 10/1949 | George | 83/4 |
| 3,330,174 | 7/1967 | Hazen et al. | 83/4 |

Primary Examiner—Donald R. Schran
Attorney, Agent, or Firm—Robert E. Wagner; Gerald T. Shekleton

[57] ABSTRACT

In the reconditioning or repair of worn out conveyor belts, such conveyor belt to be repaired is drawn at a high tension past a stationary knife edge to cut away a predetermined thickness and width of the top surface portion of the belt from the bottom reinforced portion of the belt. The height of the knife edge relative to the worn edge is adjustable thereby allowing a range of selected thicknesses to be cut for optimum results in repairing the belt in the worn areas.

2 Claims, 4 Drawing Figures

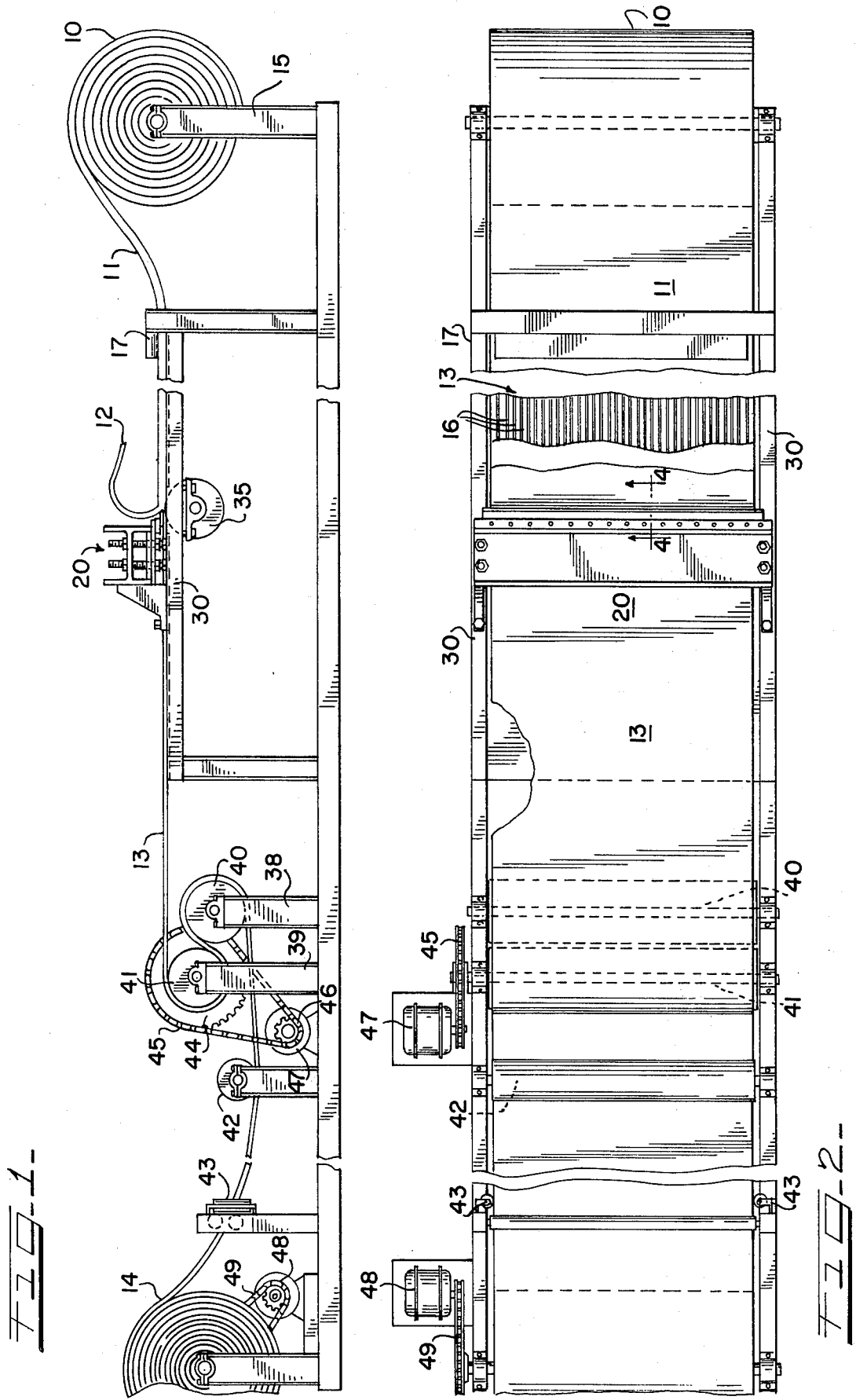

METHOD AND APPARATUS FOR REPAIRING CONVEYOR BELTS

BACKGROUND OF THE INVENTION

This invention relates to a method and apparatus for the reconditioning of conveyor belts, and in particular, to the method and apparatus by which the top worn portion of a conveyor belt may be stripped off to expose the surface underneath for reconditioning. This surface subsequently receives a layer of new material to recondition or restore the belt to its original dimensions and capabilities.

In various uses, such as quarry operations, steel mills and other heavy industrial uses, the conveyor belt has become a necessary and integral part of the manufacturing process. Because of the sometimes severe wear encountered by these conveyor belts in these and other industries it becomes necessary to replace or repair the belts at frequent intervals of time. In the industries of heaviest wear, as mentioned above, the cost of these conveyor belts and their replacements can add considerably to the cost of the end product or service, since they must be of extremely heavy and durable construction to withstand the adverse conditions such as weight and abrasion to which they are subjected.

This wear can occur in any of several different manners: longitudinal tearing, transverse tearing, or just normal wear. The physical abuses encountered while in service can, at times, wear the belt down to the underlying structural cables. At this point it becomes necessary to either purchase a new belt at a substantial expense or attempt to recondition the old one. The industry has generally elected to recondition old belts in view of the expense of new belts which cost up to $100.00 per linear foot. This high cost makes any process of reconditioning even if inefficient or crude attractive.

In general, when viewed in cross section, a conveyor belt consists of two portions, a bottom or lower portion which provides the structural strength and is generally composed of woven or twisted wire of roughly ¼ inch diameter running the length of the belt in the direction parallel with the direction of travel of the belt. The wires are spaced approximately ¼ inch apart from one another and completely encased in a belt material of rubber or other suitable flexible material. The top or load carrying portion consists of a relatively thick rubber or other material overlying and integral with that surrounding the wire structure. As already mentioned, this top or load carrying portion of the belt may become damaged or heavily worn, especially in the central area where the major amount of use takes place. Thus, a belt might develop an undesirable "belly", or cuts that cause the belt to weaken and even split laterally.

Prior to the subject invention and as taught by the prior art, repair was attempted by the slavish task of hand slitting and removing the top layer of the belt from the bottom structural portion. This hand process consisted of slitting strips 4 inches wide, the full length of the belt. The 4-inch strips were then forcibly ripped, again, by hand, from the lower structural portion to expose the surface underneath. This time consuming, labor-intensive process had to be done to the entire surface of the belt, requiring much time, strength and endurance by the laborers. After exposing a completely new surface on the belt, a new mat of rubber or other suitably strong, yet flexible surface is placed on the new surface of the belt and secured either with an adhesive or a combination of an adhesive and a vulcanizing process so that the entire top surface of the conveyor belt is replaced and once again ready for service. This manner of reconditioning of belts has not been found entirely satisfactory, both in terms of the time consumed and the results obtained. Contrary to most fields of endeavor, manual labor here produces a decidedly imperfect piece of work, resulting in a stripped portion having a structural bottom of varying thicknesses and imperfections.

SUMMARY OF THE INVENTION

The apparatus and method of the subject invention comprises feeding a worn conveyor belt past a knife edge which is adjusted to slice a predetermined thickness from the worn conveyor belt. The amount of thickness sliced is variable, but in any event, not so much as to expose the woven wire structure of the lower portion of the belt. The conveyor belt is kept extremely taut at all times by a series of rollers around and between which the belt is looped. The rollers are operatively engaged to motors, which, by rotating the rollers, draw the belt. The belt is thus drawn over a positioning drum, simultaneously passing across the knife edge, thereby cutting off the desired thickness and width of the upper portion of the worn conveyor belt. The freshly exposed surface of the bottom or structural portion then passes under the knife edge and around the powered drums to take-up reel, while the upper portion is discarded. The thickness of the remaining structural portion, of course, must vary with the amount of wear of the particular conveyor belt. Therefore, both the knife edge and the positioning drum adjustably fix their respective distance from the belt, thereby increasing the selections of desired thicknesses of belt available.

After being split in the above described manner, the conveyor belt then has a new surface vulcanized in place to recondition the belt. The savings in time and labor in the above-described method and apparatus for remanufacturing or reconditioning conveyor belts give the subject invention a tremendous advantage over the methods formerly used in the prior art. Further, the high degree of uniformity of thickness of the structural portion obtained in the use of the subject invention, restores the belt to its former strength and durability.

Other features and advantages will be apparent upon consideration of the objects achieved in the accompanying description of the preferred form of the invention.

Therefore an object of the subject invention is a method and apparatus for the remanufacture of conveyor belts.

A further object of the subject invention is the semi-automation of the formerly tedious method of stripping conveyor belts.

Yet another object of the subject invention is a method and apparatus by which a worn conveyor belt may be stripped to obtain a uniformly thick support for securing a subsequent new rubber facing thereby providing greater uniformity in the finished belt.

DESCRIPTION OF THE DRAWINGS

Additional objects will become apparent on the reference to the following description and claims when taken in conjunction with the accompanying drawings wherein:

FIG. 1 is a side view of the apparatus of the present invention;

FIG. 2 is a top plan view of the apparatus of FIG. 1, having a partial cross section therein;

DESCRIPTION OF A PREFERRED EMBODIMENT

Figure 3:
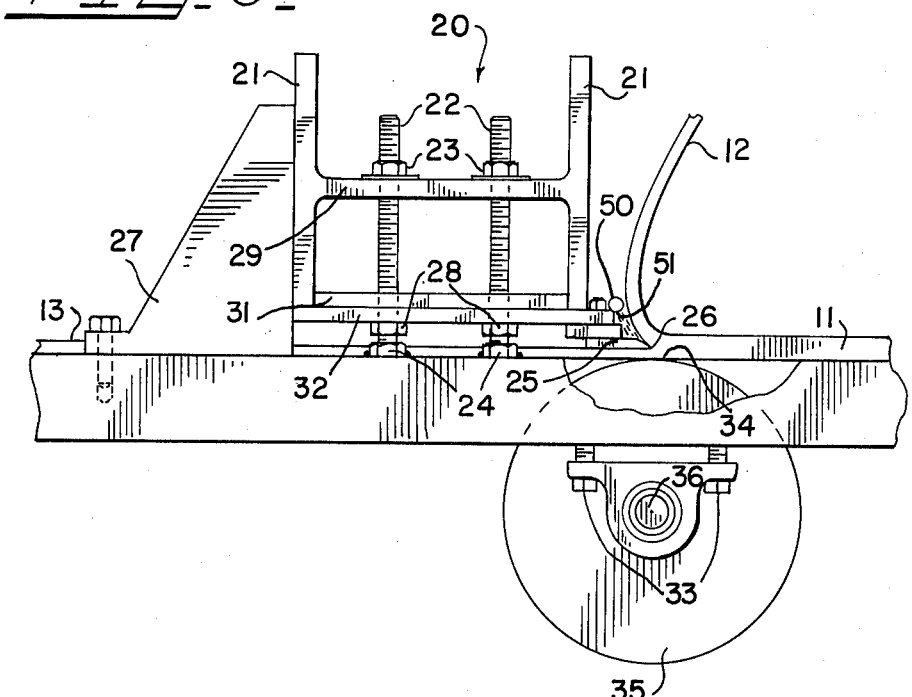
FIG. 3 is an enlarged side view of the cutting assembly of the subject invention.

Referring now to FIG. 1, there is shown the apparatus 20 for splitting a worn conveyor belt 11. This worn conveyor belt 11, is initially transported for its remanufacture in the form of a reel 10. This reel 10, is placed on a suitable support, such as 15, so that the worn belt 11 may be dispensed at a desired rate. The worn belt 11 is drawn over the table bed 30 of the splitting apparatus, being, in a sense, threaded between the table bed 30 and the belt guide 17. An initial cut is made into the worn belt 11 by hand using a knife or other suitable implement. This initial cut, of course, is made at the desired depth to allow the worn portion of the belt to be stripped off. The belt 11 is then presented to the cutting edge 26 of the knife 25 on the stripping assembly 20, and passes over a positioning device 35 or rotating drum which insures the proper angle and height of contact with the knife 25. The worn portion 12 of the belt 11 is stripped off by the knife 25 and discarded, leaving the structural portion 13 to pass under the stripping assembly 20 and from there to the take-up reel 14, to be described later.

In FIG. 2, it can be seen in the partially cut away portion of the conveyor belt 11 that the belt 11 consists of a structural portion 13. This structural portion 13 incorporates woven wires 16 of approximately ¼ inch in diameter and spaced approximately ¼ inch apart, running the length of the conveyor belt. This structural portion is the chief source of strenth of the belt in defending against deep slashes or abusive wear. It is this portion 13 which is retained for the later addition of new layers of material to constitute the remanufactured belt.

FIG. 3 is an enlarged view of the stripping assembly 20, which is adjustable as to height so that varying portions of the oncoming worn conveyor belt 11 may be split from the belt 11. This adjustability is attained by mounting a supporting H-beam 21 on threaded shafts 22 which are anchored in the frame bed 30 at its outermost edges, as can be better seen in FIG. 2. Placing the support structure at this point allows the structural portion 13 to pass underneath the stripping assembly, after being stripped of its worn portion. Anchoring these shafts 22 are bolts 24 which are welded or otherwise fixedly attached to the frame 30, the shafts 22 being screwed into the bolts 24 and through frame 30 at that point.

The H-beam 21 itself has lower crossbars 31 and 32 welded onto it. The lower crossbar 32 is extended outside of the H-beam and the knife blade 25 is removably attached thereto. The shafts 22, of course, penetrate the lower crossbars 31 and 32 so that they may engage their respective welded bolts 24. Underneath the lower crossbar 32 and engaged with the shafts 22 are positioning bolts 28. By means of these bolts 28, the H-beam may be adjusted to any height desired through the simple expedient of their rotation. In adjusting the height it is important that both sides of the H-beam 21 be adjusted laterally so as to be parallel to the plane of the oncoming worn belt at all times. The central crossbar 29 of the H-beam is an integral part of he H-beam 21 and also accepts the shafts 22 through respective openings. On top of the central crossbar 29 are tightening bolts 23 threadedly engaged on the respective shafts 22.

Once the H-beam is positioned at the desired height by means of the positioning bolts 28 the H-beam is tightened and secured to remain at that height by means of the tightening bolts 23. If desired, a pipe 50 having a plurality of openings 51 may be disposed above the knife edge. Water or other fluid may be sprayed on the knife edge to cool the blade and improve the cutting action.

Another means of adjusting the height of the blade 25 with respect to the oncoming worn belt 11 is the positioning of the roller 35. The roller 35 is mounted on a shaft 36 for rotation thereabout. The entire shaft 26 and roller assembly 35 is attached to the frame 30 by a set of bolts threadedly secured to the frame 30. By proper rotation of these bolts 33, the roller may be adjusted in a vertical fashion with respect to the knife blade 25. Again, care must be taken to adjust both sides of the roller assembly 35 equally to achieve a plane parallel to the worn belt. The entire roller 35 is positioned along the frame 30 so that the knife edge 26 is directly over the center of the roller shaft 36. In this manner the belt is in contact at all times with the roller 35 at the exact same point as that point on the belt 11 which is being split. Thus, a uniformity of thickness of the material being split is assured at any given moment and for any given thickness of belt being drawn across the splitting assembly 20.

Since the belt 11 is kept at a constant high tension when drawing it across the knife edge 26 this subjects the H-beam to a tremendous force in the direction of the pulling force. To counteract this force a supporting wedge 27 is secured to the frame 30 along the outside by appropriate bolts. To allow the vertical adjustment of the assembly 20, the H-beam 21 is not attached to the supporting bracket 27 but is merely supported by it, when the belt 11 pulls it back.

Figure 4:
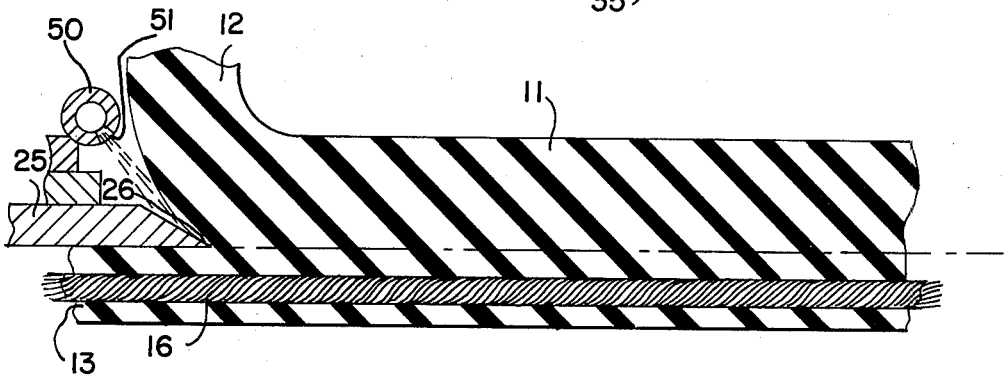
FIG. 4 is a cross section taken along the lines 4—4 of FIG. 2.

FIG. 4 shows in greater detail the splitting process. Here the worn belt 11 is drawn across the blade 25 thereby splitting off the worn portion 12, leaving the desired amount of material in the structural portion 13 remaining above the woven wire 16. As illustrated in FIG. 4, the cut is straight leaving a portion 13 of constant thickness and uniform characteristics. No weak spots are created in this method since an operator cannot cut down to bare wire or, split off too little, either of which blunders can cause problems in the subsequent fittings of a new layer of material and thus cause areas subject to tearing under stress or excessive wear.

The manner of keeping the belt taut thereby drawing it onto the blade 25 is accomplished by threading the structural portion of the belt 13 around and between two rollers 40 and 41 which are mounted on their respective supports 38 and 39. The first roller 41 is driven by a motor 47 having a chain 45 operatively connected with a sprocket 46 on the motor 47 and a sprocket 44 on the roller 41. Thus, the roller 41 pulls the worn belt 11 past the splitting assembly 20. From the second roller 40 the structural portion of the belt 13 passes under a tensioning roller 42, past guiding casters 43 onto a take-up reel 14. This take-up reel 14 is also powered by a motor 48 and chain 49 thereby aiding the first motor 47 in keeping the worn belt 11 taut against the knife 25.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of refinishing a linear worn conveyor belt by splitting the worn conveyor into a worn portion and a structural portion, and securing a new surface on said structural portion; said method comprising the steps of:

mounting a conveyor belt between a feed roll and a take-up roll in a position for continuous feeding of said belt at a desired height and attitude, said belt having a worn portion and a structural portion, positioning an adjustable knife edge in the path of the belt between said rolls, said knife edge being fixed relative to the travel of said belt;

making an initial cut across the width of a leading edge of the belt;

feeding said leading edge of the belt past a first stationary positioning means, said first positioning means orienting said belt in a desired attitude;

drawing said leading edge of said belt over a second positioning means spaced from said first positioning means, said second positioning means adjustable to present said leading edge at a desired height to said knife edge;

allowing the upper portion of said belt to move freely between said first positioning means and said knife edge;

adjusting said second positioning means to present said belt at the desired height and angle to said knife edge;

adjusting said knife edge to position said knife edge at a desired height relative to said positioning means;

tensioning said belt between said positioning means;

drawing said tensioned belt past said knife edge at a continuous and uniform rate onto said take-up roll, thereby severing a worn portion of said belt from said reusable structural portion, whereby a new upper surface may be secured on said structural belt portion to obtain a resurfaced conveyor belt having a highly uniform thickness and a new surface thereon.

2. The method of claim 1 which includes spraying a liquid over said knife edge as said worn belt is drawn past said knife edge to enhance the cutting action.

* * * * *